Oct. 20, 1970  T. O. PAINE  3,534,479
DEPUTY ADMINISTRATOR OF THE NATIONAL AERONAUTICS
AND SPACE ADMINISTRATION
STRAIN SENSOR FOR HIGH TEMPERATURES
Filed Oct. 17, 1968  2 Sheets-Sheet 1
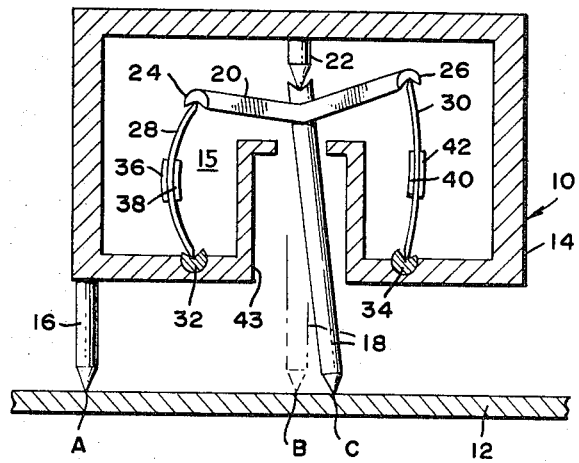
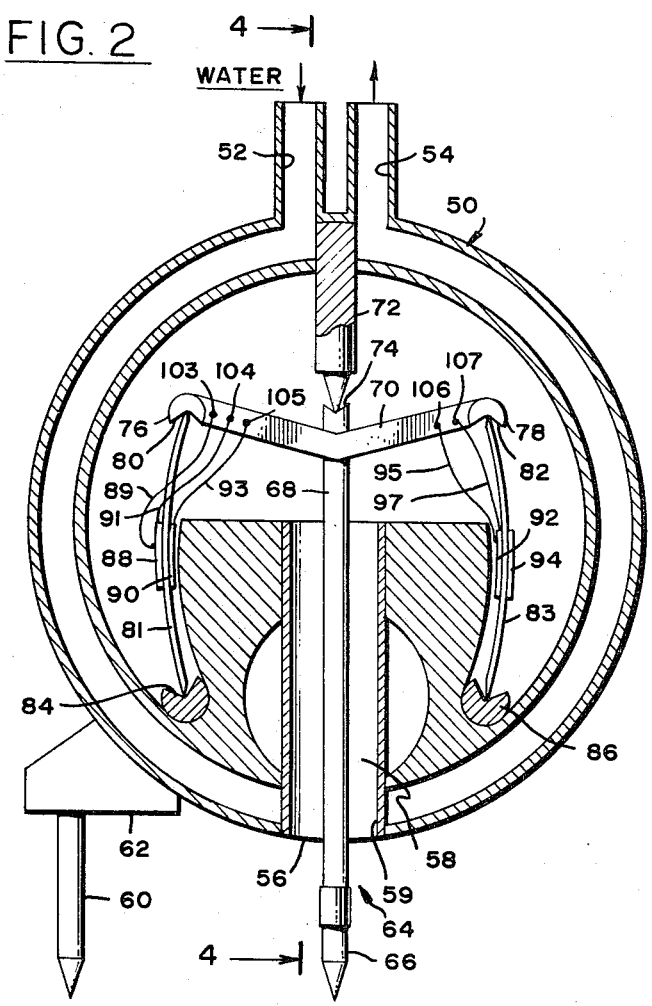
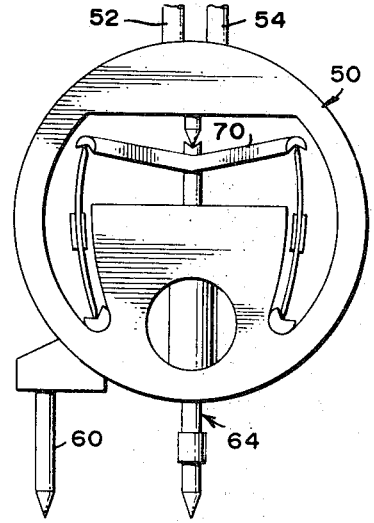
E. HAROLD EVANS
INVENTOR.
BY
ATTORNEYS Oct. 20, 1970

T. O. PAINE
DEPUTY ADMINISTRATOR OF THE NATIONAL AERONAUTICS
AND SPACE ADMINISTRATION
STRAIN SENSOR FOR HIGH TEMPERATURES 3,534,479

Filed Oct. 17, 1968

E. HAROLD EVANS
*INVENTOR.*

BY

ATTORNEYS

United States Patent Office 3,534,479
Patented Oct. 20, 1970

3,534,479
STRAIN SENSOR FOR HIGH TEMPERATURES
T. O. Paine, Deputy Administrator of the National Aeronautics and Space Administration, with respect to an invention of E. Harold Evans, Kirkland, Wash.
Filed Oct. 17, 1968, Ser. No. 768,473
Int. Cl. G01b 3/16
U.S. Cl. 33—149                 5 Claims

ABSTRACT OF THE DISCLOSURE

Apparatus is disclosed for measuring strain in a specimen subjected to high temperatures. The apparatus comprises a water-cooled frame having a fixed post and a pivotably mounted leg, the post and leg having outer ends contacting the specimen. A crossarm fixed to the inner end of the leg has opposite ends that are supported by a pair of buckled columns. Strain gauges on the columns indicate the amount of any column buckling or straightening, to thereby indicate pivoting of the leg caused by strain of the specimen. The crossarm, columns, and strain gauges are located within the water-cooled frame, and the pivotable leg extends through a long water-cooled tube to shield the inside of the frame from radiation emitted by the heated specimen.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

Field of the invention

This invention relates to dimension measuring apparatus and, more particularly, to devices for measuring strain.

Description of the prior art

The measurement of strain in materials which are at high temperatures has become increasingly important as high performance space vehicles, super-sonic aircraft and other apparatus are developed. Some of the newer materials developed for such applications have substantial strength at temperatures as high as 3,000° F., and strain gauges are required for accurate measurements at such elevated temperatures.

Accurate strain measurement at room temperatures is generally accomplished by the use of sensing elements whose electrical resistance varies with strain. The changes in resistance can be measured using electrical bridges, to provide accurate measurements with great convenience. In many cases, the sensing elements are attached directly to the specimen undergoing strain. However, it is difficult to use such techniques in measuring specimens which have been heated to a high temperature because the sensing elements normally cannot operate at very high temperatures. In fact, some of the best sensing elements are preferably utilized at temperatures below about 200° F. Means for utilizing available strain sensing elements while protecting them from the heat of the specimen being tested would greatly facilitate high temperature strain measurements.

OBJECTS AND SUMMARY OF THE INVENTION

One object of the present invention is to provide an accurate and easily employed strain gauge for high temperature applications.

Another object is to provide sensitive and reliable apparatus for measuring strain in specimens which have been heated to high temperatures.

In accordance with the present invention, a precision strain sensor is provided which is capable of operating with specimens which are at a high temperature. The apparatus comprises a water-cooled frame with a pair of legs protruding therefrom for contacting spaced points on the specimen. One leg is fixed to the frame while the other is pivotally mounted thereon. Spring members extending between the pivotable leg and the frame are bent as the leg pivots. The amount of bending of the spring members indicates the amount of pivoting of the pivotable leg.

Strain sensing elements are attached to the spring members to measure their degree of bending. This indicates the amount of leg pivoting which, in turn, indicates the amount of strain of the specimen. The pivot, spring members and strain sensing elements are located within the frame, where they are shielded from heat and are water-cooled. The legs which contact the heated specimen are constructed of a material capable of withstanding high temperatures, and the opening through which the pivoted leg extends is positioned to limit the amount of radiation entering therethrough.

In one embodiment of the invention, the inner end portion of the pivotally mounted leg is attached to a crossarm. A pair of buckled column members of a spring material support opposite sides of the crossarm. When the pivotable leg and crossarm pivot, one column member elongates while the other contracts. A pair of strain sensing elements is attached to each column member to indicate its elongation or contraction. The strain sensing elements provide electrical outputs which enable remote sensing of strain by an electrical bridge.

BRIEF DESCRIPTION OF THE DRAWINGS

FIG. 1 is a simplified illustration of strain sensing apparatus constructed in accordance with the present invention, showing its principles of operation.

FIG. 2 is a sectional front elevation view of a strain sensor constructed in accordance with the invention.

FIG. 3 is a front elevation view of the strain sensor of FIG. 2, with the front cover thereof removed.

DESCRIPTION OF THE PREFERRED EMBODIMENTS

Figure 4:
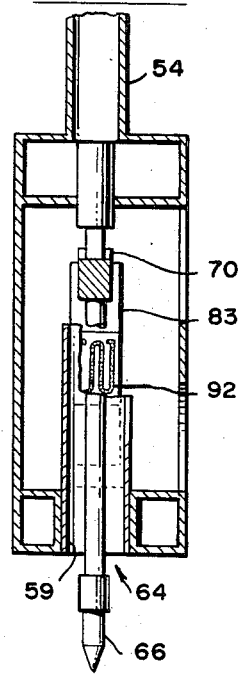
FIG. 4 is a sectional side elevation view of the strain sensor of FIG. 2.

FIG. 1 illustrates a simplified strain sensor 10, which is applied to a specimen 12 to measure its elongation. The gauge comprises a frame 14 from which there protrudes a fixed post or leg 16 which is fixed to the frame, and a pivotable leg 18 which is pivotally joined to the frame. The fixed leg 16 contacts the specimen at point A while the pivotable leg 18 initially contacts the specimen at point B. When the specimen 12 is subjected to thermal or mechanical elongating forces, the point B moves to the position C, causing pivoting of the leg 18.

The inner end of the pivotable leg 18 pivots about a knife edge support 22 which is fixed to the frame at the inner area 15 thereof. A crossarm 20 which is located within the frame is fixed to the inner portion of the pivotable leg. Opposite ends of the crossarm are supported by buckled column members 28 and 30. The column members extend between seats 24 and 26 mounted on the ends of the crossarm, and seats 32 and 34 which are mounted on the frame. The changes in distance between points at the seats 32 and 34 on the frame and the seats 24 and 26 on the crossarm are proportional to the movement of the outer end of the pivotable leg 18.

When the leg 18 pivots so that its outer end moves from position B to position C, column member 28 buckles even further while the other column member 30 is allowed to straighten somewhat. A pair of strain sensing elements 36 and 38 are attached to the first column member 28 while a similar pair of strain sensing elements 40 and 42 are attached to the other column member, to measure changes in the configuration of the column members. By measuring the change in the strain of the strain sensing elements, the change in distance between the stationary seats 32, 34 and the seats 24, 26 at the opposite ends of the crossarm can be determined. This, in turn, indicates the amount of pivoting of the pivotable leg 18 and therefore the elongation of the specimen 12.

When the pivotable leg 18 pivots in the manner shown in FIG. 1, strain sensing elements 36 and 40 undergo additional tension (or decrease in compression) while the other elements 38 and 42 undergo additional compression (or decrease in tension). The change in tension or compression can be accurately determined by measuring the change in electrical resistance of the sensing elements. The change in resistance of commonly available sensing elements can be determined with great accuracy, to thereby determine the elongation of the specimen 12 with great accuracy.

The buckled column members 28 and 30 assume on almost straight configuration when buckling forces are removed. Thus, they serve as spring members that tend to push the pivotable leg 18 into firm engagement with the knife edge support 22. Other types of spring members can be used in place of the column members. The knife edge support 22 allows the leg 18 to pivot with a minimum of resistance, to enable high accuracy in measurements. The only components of the strain sensor which contact the specimen 12 are the two legs 16 and 18. The other elements of the strain sensor, particularly the strain sensing elements are located at the inner area 15 of the frame. These elements are not only held away from the hot specimen, but are shielded from radiant heat by the frame 14, including a tube 43 through which the pivotable leg extends. If appropriate cooling of the frame is provided, strains can be measured in the specimen 12 even when it is heated to a very high temperature, without subjecting the sensitive strain sensing elements to a detrimental temperature rise. The only components which are in contact with the heated specimen are the legs 16 and 18. Since these legs serve no function except to transmit simple forces, they can be constructed of available materials which can withstand high temperatures.

FIGS. 2, 3, and 4 illustrate a strain sensor whose manner of operation is similar to that of the simplified sensor of FIG. 1, but in which the frame 50 is water-cooled. The frame 50 has a water inlet 52 for receiving cooling water and an outlet 54 for carrying away the water. The outer walls of the frame form a conduit which carries the water along the frame perimeter. At an outer or front portion 56, the conduit divides into two channels so as to leave an aperture 58. A tube 59 is provided which forms the walls of the aperture. A fixed leg 60 and pivotable leg 64 extend from the frame for application to a specimen to measure its strain. The fixed leg 60 is fixed to a bracket 62 which is mounted at one side of the frame.

The pivotable leg 64 extends through the aperture 58 in the frame to the inner area thereof. The outer end 66 of the leg has a pointed tip to facilitate engagement with a specimen whose strain is to be measured. Both the fixed leg 60 and the outer end 66 of the pivotable leg are constructed of a material which is rigid at high temperatures and has low thermal conductivity, such as a polycrystalline ceramic of alumina. Synthetic sapphire has been found well suited for this application. The inner end 68 of the pivotable leg is clamped to a crossarm 70. A knife edge support 72 fixed to the rear of the frame engages a bearing portion, in the shape of a cutout V section 74, formed in the end of the pivotal leg. The opposite ends 76 and 78 of the crossarm have notch seats 80 and 82 joined thereto. A pair of buckled column members 81 and 83, each have one end engaged in seats 80 and 82 on the crossarm. The other ends of the column members are engaged in seats 84 and 86 which are held on the frame.

Four strain sensing elements 88, 90, 92, and 94 are attached to the sides of the column members. Five electrical conductors 89, 91, 93, 95, and 97 couple five terminals on the sensing elements 88, 90, 92 and 94, to five terminals 103, 104, 105, 106, and 107 on the crossarm. (Additional connections, not shown, are provided between the sensing elements.) Five electrical leads (not shown) extend from the five terminals 103 through 107 along the inlet and outlet pipes 52 and 54 to enable the measurement of changes in resistance of the sensing elements. Such resistance changes indicate the amount of bending of the column members, and therefore the amount of pivoting of the pivotable leg 64.

The strain gauge of FIGS. 2, 3, and 4 enables strain measurements to be performed on high temperature specimens without subjecting the sensing elements to a high temperature. The low thermal conductivity of the outer end 66 of the pivotable leg, and the long thermal path between it and the ends 76 and 78 of the crossarm keep thermal conduction to the sensing elements at a minimum. Both the sensing elements and the column members 81 and 83 are out of line with the aperture 58 through which the leg extends, so a minimum of radiant heat reaches the sensing elements and column members to raise their temperature. Little heat passes through the enclosure defined by the frame 50 to the sensing elements because of the water cooling. The water cooling of the portions of the frame lying between the specimen and the sensing elements, including the area about the aperture 58 is particularly important. The large amounts of heat adsorbed by these portions of the frame would heat up the sensing elements if these frame portions were not directly water-cooled.

Figure 5:
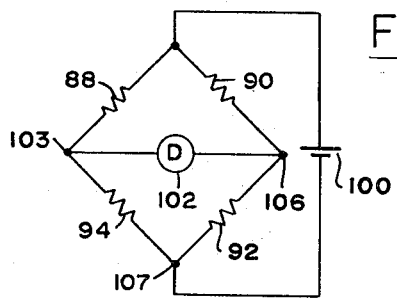
FIG. 5 is a schematic diagram of an electrical bridge circuit connection for the strain sensor of FIG. 2.

FIG. 5 is a schematic diagram showing the basic electrical connections of the sensing elements. The elements are connected to form a bridge arrangement, and a voltage source 100 and bridge detector 102 are provided to measure changes in resistance. A typical example of strain gauge operation involves the counterclockwise pivoting of pivotable leg 64 of FIG. 2 to further buckle the column member 81 while relieving the other column member 83. As a result, sensing elements 88 and 92 are subjected to greater tension and therefore acquire a greater resistance, while the other sensing elements 90 and 94 relieved of tension (or are subjected to compression) and acquire a smaller resistance. In the circuit of FIG. 5, this results in terminal 103 acquiring a lower voltage while terminal 106 acquires a higher voltage, causing the bridge detector 102 to detect a voltage difference. An additional bridge resistance may be introduced in series with the sensing element 90 or the element 94 in order to balance the bridge. The amount of additional resistance required to achieve a balance indicates the amount of pivoting of the pivotable leg 64 and therefore the strain of the specimen being tested.

Figure 6:
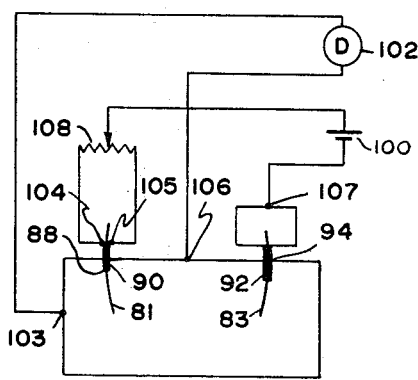
FIG. 6 is a diagram showing electrical connections of the strain sensor for realizing the bridge circuit of FIG. 5.

FIG. 6 illustrates one type of electrical connection which results in a bridge circuit of the type shown in FIG. 5. In addition, a rheostat 108 is provided to introduce variations in the resistances between terminals 104 and 105 so as to balance the bridge. Initially, the rheostat 108 is established with its wiper in the center position so that there is as much resistance in series with the element 88 as there is in series with the other element 90. When strain is to be measured, the wiper of rheostat 108 is moved until the bridge detector 102 again achieves a null. If the markings on the rheostat wiper are properly calibrated, the strain of the specimen being tested can be read directly from the movements of the wiper arm of the rheostat 108. It can be seen that most of the connections between the sensing elements can be made internally, and only five external connection points are required for attachment of the voltage source 100, the detector 102, and the rheostat 108.

Figure 7:
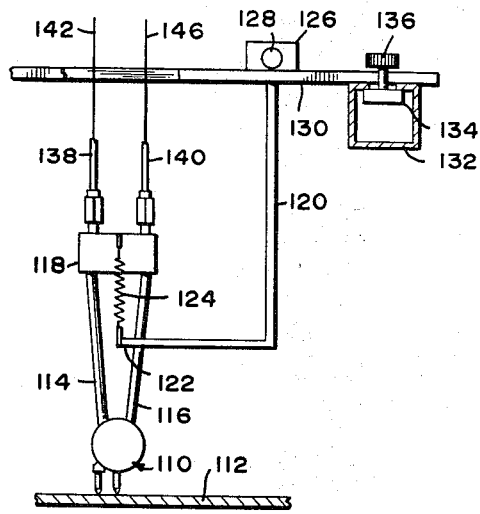
FIG. 7 is a front elevation view of the strain sensor of FIG. 2, showing its application to a test specimen.

FIG. 7 illustrates one manner of application of a strain gauge 110 of the invention to a specimen 112 whose strain is to be measured while it is subjected to a very high temperature. A pair of rigid water tubes 114 and 116 which lead to the water inlet and outlet of the strain gauge 110 are firmly attached to a bracket 118. A pair of rods 120 located on either side of the bracket (one rod being located directly behind the rod shown in FIG. 7) have rod ends 122 that are below the level of the bracket. A pair of springs 124, which are under tension, couple the bracket to the rod ends 122. The springs pull the bracket 118 downwardly, causing the strain gauge 110 to bear firmly against the specimen 112.

The upper ends of the rods 120 are supported by a rod mount 126 which lies on a cross beam 130. The rod mount has an adjusting knob 128 which can be loosened to adjust the vertical position of the rods, and therefore the force with which the strain gauge bears against the specimen, and which then can be tightened to hold the rods in position. The cross beam 130 which holds the rod mount is supported by a main beam 132. A clamp 134, which holds the cross beam against the main beam, has a tightening knob 136 which allows the cross beam to be moved along the length of the main beam and then clamped in place. The rods 120 and the structure for holding it, serve as support means for holding the strain sensor to the specimen. The bracket 118 is coupled to a pair of flexible hoses 138 and 140 for carrying water to and from the water tubes 114 and 116. In addition, two sets of electrical leads 142 and 146 run along the flexible hoses and the water tubes in order to provide electrical connections to the strain gauge.

Figure 8:
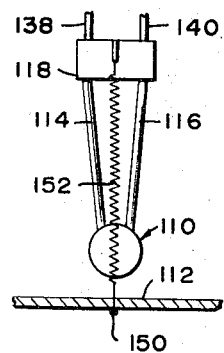
FIG. 8 is a front elevation view of the strain sensor of FIG. 2 showing another manner of application to a test specimen.

FIG. 8 illustrates another manner of applying the strain gauge 110 to the heated specimen 112. As in FIG. 7, the strain gauge 110 is coupled to a pair of water tubes 114 and 116 which lead to a bracket 118 that is coupled to flexible hoses 138 and 140. Instead of using angled rods as support means to hold down the brackets, a transverse rod 150 is utilized which lies beneath the specimen 112 and extends across it. A pair of springs 152 extend between the bracket 118 and the ends of the rod 150, to hold the bracket 118 and strain gauge 110 to the specimen.

Although particular embodiments of the invention have been described and illustrated herein, it is recognized that modifications and variations may readily occur to those skilled in the art.

What is claimed is:
1. Apparatus for measuring strain comprising:
   a frame;
   a first leg fixed to said frame and extending therefrom;
   knife edge means mounted on said frame;
   a second leg having an outer end portion extending from said frame and an inner end portion, said inner end portion having bearing means engaged with said knife edge means;
   crossarm means fixed to said inner end portion of said second leg and extending to opposite sides thereof;
   members extending between said crossarm means and said frame for urging said bearing means towards said knife edge means; and
   means coupled to said members for measuring changes in their configuration.

2. The apparatus described in claim 1 wherein:
   said frame defines an enclosure having an aperture through which said second leg extends, and said members for urging said bearing means towards said knife edge means are positioned within said enclosure out of line with said aperture therein.

3. The apparatus described in claim 1 wherein:
   said legs comprise rigid material of low heat conductivity.

4. Apparatus for measuring strain in a specimen comprising:
   a frame having knife edge means;
   first leg means fixed to said frame;
   second leg means having an outer end for contacting said specimen, and an inner end pivotally engaged with said knife edge means; and
   means for measuring the relative pivoting of said leg means including crossarm means fixed to said inner end of said second leg means, said crossarm means having portions disposed on opposite sides of said second leg means, biasing means extending between said frame and said portions of said crossarm means on opposite sides of said second leg means for urging said inner end of said second leg means against said knife edge means, and means for measuring changes in length of said first and second biasing means.

5. Apparatus for measuring strain in a specimen comprising:
   a frame having an inner area and an aperture extending between said inner area and positions outside of said frame;
   a first leg fixed to said frame for contacting said specimen at a first point;
   a second leg having an outer end for contacting said specimen at a second point spaced from said first point and an inner end portion extending through said aperture to said inner area of said frame;
   means for pivotally coupling said second leg to said frame, including a knife edge support and bearing means;
   crossarm means coupled to said inner end portion of said second leg, said crossarm means extending on opposite sides of said knife edge support and bearing means to a position within said inner area which is substantially out of line with said aperture; and
   a pair of spring members within said inner area, each extending between a point on an opposite side of said crossarm means which is substantially out of line with said aperture and a point on said frame, for urging said knife edge support and bearing means towards each other; and
   means for measuring changes in the distance between said points.

References Cited
UNITED STATES PATENTS

| | | | |
|---|---|---|---|
| 2,472,045 | 5/1949 | Gibbons | 73—88.5 |
| 2,484,164 | 10/1949 | Hathaway | 33—148 |
| 2,543,429 | 2/1951 | Wood | 33—148 |

LEONARD FORMAN, Primary Examiner

C. E. PHILLIPS, Assistant Examiner

U.S. Cl. X.R.

33—148